United States Patent [19]

Weldy

[11] 4,193,377

[45] Mar. 18, 1980

[54] PANEL STRUCTURE FOR ANIMAL PENS

[76] Inventor: Levon R. Weldy, 911 E. Waterford St., Wakarusa, Ind. 46573

[21] Appl. No.: 912,102

[22] Filed: Jun. 2, 1978

[51] Int. Cl.² ............................................. A01K 1/02
[52] U.S. Cl. .................................... 119/20; 256/26
[58] Field of Search ............... 119/20; 256/26; 16/169

[56] References Cited
U.S. PATENT DOCUMENTS

| | | | |
|---|---|---|---|
| 907,204 | 12/1908 | Walters | 256/26 |
| 3,648,980 | 3/1972 | Taylor | 119/20 X |

Primary Examiner—Louis G. Mancene
Assistant Examiner—Daniel J. Leach
Attorney, Agent, or Firm—Marmaduke A. Hobbs

[57] ABSTRACT

A panel structure for animal pens in which downwardly extending stems are disposed near the top and bottom of one end thereof, and a supporting structure is provided with ring-like fixtures for receiving said stems. A bracket is disposed above one of said stems and has a pivoted element which swings between the horizontal and a downwardly extending vertical position for retaining the stems in their assembled position in the ring-like fixtures. One or more sets of upper and lower ring-like fixtures and brackets with a pivoted element thereon may be provided at the opposite end of the panel to facilitate completion or extension of the pens. The pens are preferably constructed of upper and lower rails with horizontally spaced vertically arranged bars connected to the rails to form a rigid structure.

10 Claims, 5 Drawing Figures

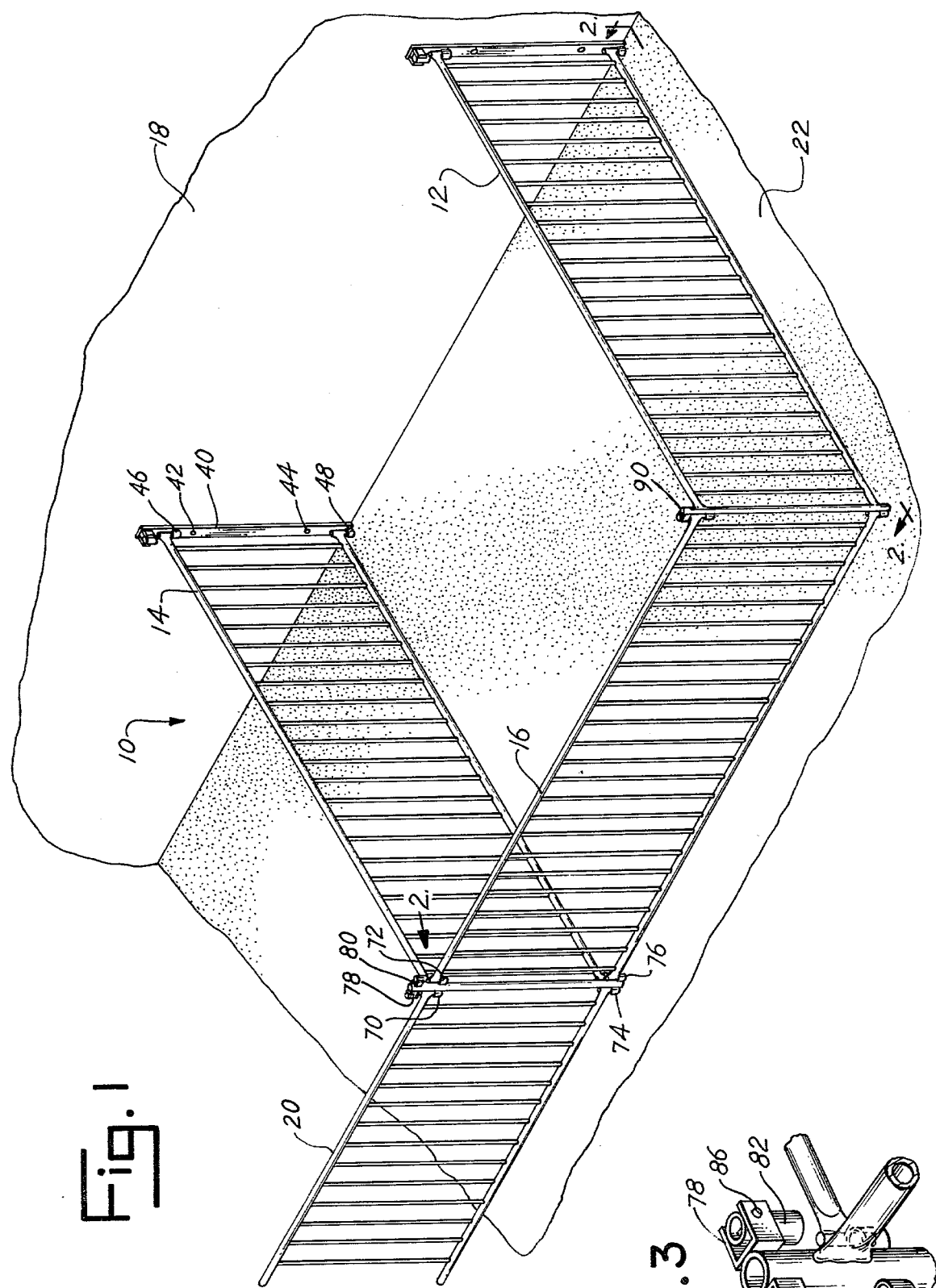
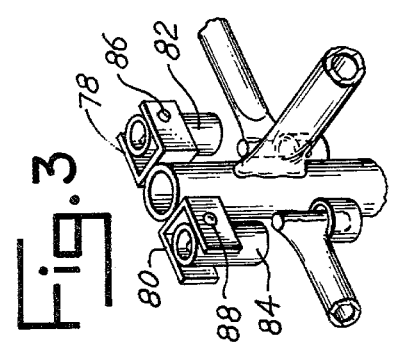

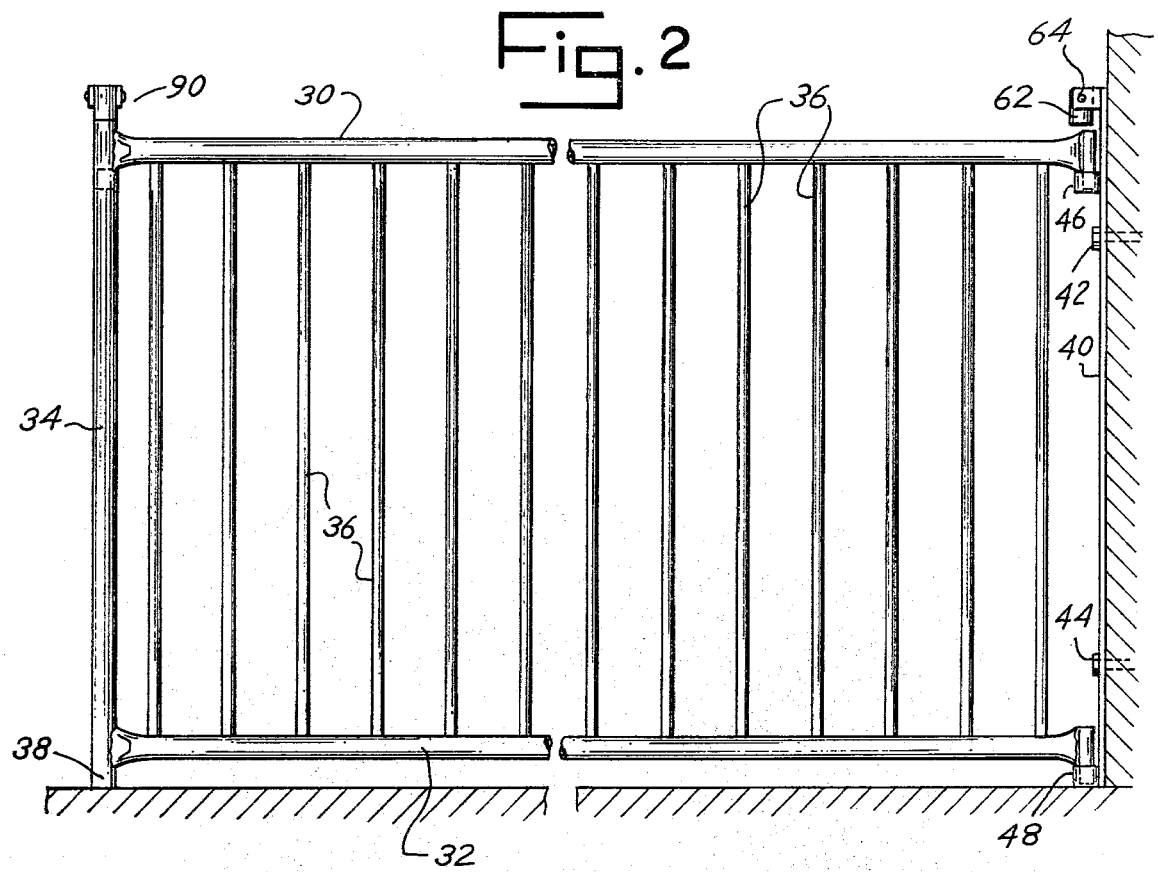
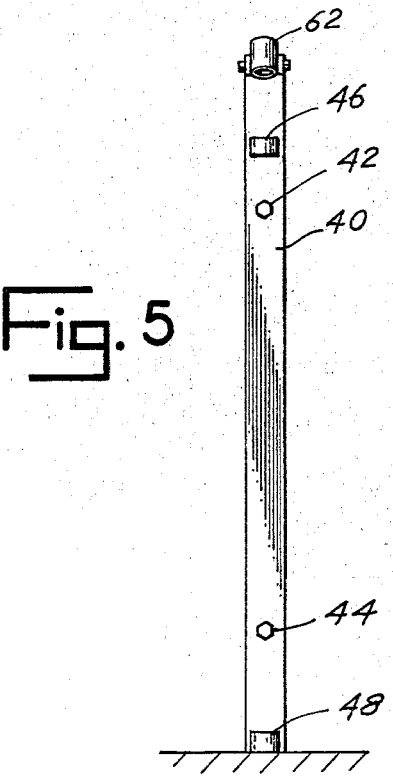
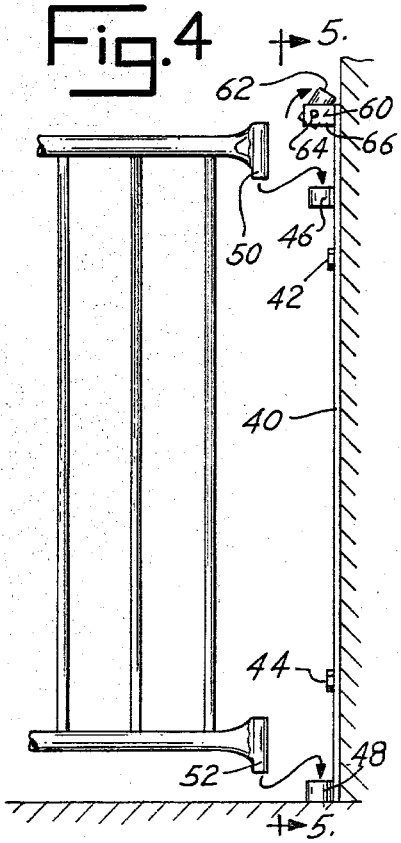

PANEL STRUCTURE FOR ANIMAL PENS

Prefabricated metal panels for constructing pens and other enclosures for farm animals such as hogs are extensively used in agriculture and permit the formation of pens of various sizes and shapes. The prior pen panels of conventional construction have often lacked the versatility and convenience necessary to adapt the structure to various uses and types of installations, and the connecting means between the panels or between the panels and a supporting structure, such as a wall, post or the like, have either been difficult to latch and unlatch, or have been unreliable, in that the animals occasionally have been able to disconnect the connecting means and remove or displace one or more panels and escape. Attempts to overcome these disadvantages have often resulted in the use of complicated connecting structures or mechanisms which are expensive to produce and require attention or servicing to maintain in operating condition, and which are bulky and protrude above or outwardly from the panels or supporting structure. Further, the conventional prefabricated pen panels lack the versatility to permit their use in some types of buildings or enclosures to form different sizes and shapes of pens. It is therefore one of the principal objects of the present invention to provide a prefabricated panel for constructing animal pens and the like, which can be readily assembled to form a variety of different pen configurations and sizes, and which has a means for connecting the panels together to a supporting structure, that is simple and convenient in operation.

Another object of the invention is to provide a panel for animal pens, which is strong and will safely restrain the animals, and which has a connecting fixture so constructed and designed that it cannot be released by animals in the pen but can be readily unlatched to remove one or more panels and to readily construct the pens and to disassemble them when they are to be removed.

Still another object of the invention is to provide a connecting or latch means in combination with a rigid pen panel, which has only one principal moving part for latching and retaining the panel in connected relationship with another panel, post or other supporting structure, and which can easily be fabricated using standard materials and equipment and will operate effectively and efficiently over long periods of time without servicing or other attention.

A further object is to provide a connecting device for assembling panels of the aforesaid type, which, while simple in construction and operation, is extremely difficult or impossible for an animal to manipulate to dislodge and displace the panels from their supporting structure, and which can be easily fabricated and assembled in operating position.

Additional objects and advantages of the present invention will become apparent from the following description and accompanying drawings, wherein:

FIG. 1 is a perspective view of an animal pen layout, using the present panel structure system;

FIG. 2 is an enlarged elevational view of one of the panels shown in FIG. 1;

FIG. 3 is an enlarged fragmentary view of one of the panel connecting devices used in the present animal pen system;

FIG. 4 is a fragmentary elevational view illustrating the manner in which the connecting device is assembled and disassembled; and FIG. 5 is an elevational view of one of the supporting members for the panel on which a portion of the connecting device is mounted.

Referring more specifically to the drawings and to FIG. 1 in particular, numeral 10 indicates generally a pen layout arrangement showing one pen formed by side panels 12 and 14 and front panel 16. The two side panels are connected to wall 18 and to the front panel to complete the pen area. Panel 14 separates the pen from an adjacent pen which is formed by similar panels, including a front panel 20 similar in construction to panel 16. The present panel is so constructed and designed that it can easily form a variety of different sized pens and can be used to construct a system covering a large floor area in a building or elsewhere for animals such as hogs, the system shown illustrating hog nursery and finishing pens formed by the present panel structure. The pens are on a floor 22 which may be of concrete or other suitable flooring, and wall 18 may be a solid partition or the outside wall of a building in which the pen system is installed.

Each panel consists of a top rail 30 and a bottom rail 32 and an upright 34 rigidly connected by welding or other suitable connecting means, to one end of rails 30 and 32. The panel includes a series of spaced, vertical bars 36 connected at their upper and lower ends to rails 30 and 32, preferably by welding; however, they may be inserted in holes drilled into the two rails. The rails, upright and bars are constructed of metal, preferably steel, although aluminum may be used for certain applications of the panels. The upright 34 has an extension 38 at its lower end which forms a leg for supporting rail 32 an inch or two above the floor on which the pen rests.

In the embodiment of the invention illustrated in the drawings, a post 40, consisting of a metal bar which is rigidly attached to wall 18 by screws 42 and 44, supports the end of the panel, the bar having an upper metal ring 46 and a lower metal ring 48 into which stems 50 and 52 on the upper and lower ends of the panel, respectively, seat when the panel end is attached to the post. The panel is connected to the post by merely inserting the two stems 50 and 52 in the respective rings 46 and 48. The stems are held in the two rings by a latch 60 having a bolt-like element 62 pivoted on a pin 64 on fixture 66, the fixture being rigidly attached to the upper end of post 40. When the element is pivoted upwardly, as illustrated in FIG. 4, the stems 50 and 52 can easily be removed from rings 46 and 48 by lifting the panel until the stems clear the respective rings. When the stems have been inserted in the two rings, the panel is effectively held in assembled position by merely rotating the element 62 from its raised position in FIG. 4 to its lowered position in FIG. 2. When the element is in its lowered position, it prevents the end of the panel from being raised sufficiently for the two stems to clear the respective rings. Thus the end of the panel is effectively attached to the post and will prevent a hog or other animal from lifting the panel and disengaging the stems from the two rings. Stem 52 may also be used to hold the end of the rail on a position level with the opposite end of the rail.

In order to form the front corners of a pen or a series of pens such as illustrated in FIG. 1, the upright 34 is provided with upper rings 70 and 72 and lower rings 74 and 76 rigidly attached to the sides of the upright. A pair of fixtures 78 and 80 are attached to the upper end of the upright and support elements 82 and 84, respectively, on pins 86 and 88. The two elements thus operate in the same manner as element 62, in that they pivot between raised and lowered positions to lock and release the stems at the adjacent end of the panel, the adjacent pen panel having stems 50 and 52 at their upper and lower ends of the same construction and arrangement as illustrated in FIG. 4 for seating in rings 70 and 74 or rings 72 and 76, respectively. After the stems have been seated in their respective rings while the elements are in their upwardly pivoted position, the elements are swung downwardly to the position illustrated in FIG. 3, thereby preventing the ends of the panels from being raised sufficiently to disengage the stems from their respective rings.

In the use and operation of the panels to construct an animal pen, such as a hog nursery or finishing pen, a pair of posts 40 are secured to the wall in the manner illustrated in FIG. 1, and the two panels are attached by first raising element 62 and then inserting stems 50 and 52 in rings 46 and 48. After the stems have been inserted in the rings, the element is swung downwardly to retain the stems in the rings. Front panel 16 is then assembled between panels 12 and 14, using the connecting means mounted at the outer ends of the panel to hold the stems at opposite ends of panel 16 in the rings secured to the end uprights of panels 12 and 14. Panel 16 is retained in place by the respective elements of the fixtures 78 or 80. Since the panels 12 and 14 are preferably identical in construction, each contains a pair of upper and a pair of lower rings for receiving the stems of front panels 16 and 20. After the pen has been formed in this manner, it can be extended in either direction by additional panels, using panels similar to 16 and 20. A complete system containing many pens may be constructed over a large floor area, using the panels having the connecting devices for holding the stems in the respective rings.

Panels 12 and 14 may be identical in construction with a double set of upper and lower rings and retaining elements on opposite sides of upright 34, or only one ring and element may be used such as that indicated at numeral 90; however, the preferred construction includes the arrangement illustrated at the end of panel 16 in which the rings are disposed on opposite sides of the upright so that the pen can be extended in either direction. One of the primary advantages of the present invention is the use of the element 62 pivoting between the upper and lower position, for holding the stems at the ends of rails 30 and 32 in the respective rings 46 and 48. This type of retaining means is not only simple, but also very difficult for an animal to unlatch, and hence failure of the pen structure by action of the animals contained therein is minimized or fully eliminated. With this type of structure the panels can be easily assembled and disassembled, since the element only needs to be flipped upwardly to permit disassembling and flipped downwardly after the stems have been placed in the respective rings to hold the panels in place.

While only one embodiment of the present panel structure for animal pens, and the latching device therefor, has been described in detail herein, various changes and modifications may be made without departing from the scope of the invention.

I claim:

1. A panel structure for animal pens, comprising a panel, a stem connected to one end of the panel near the top thereof and extending downwardly, a stem connected to said one end of the panel near the bottom thereof and extending downwardly, a supporting member adapted to be disposed at said one end of the panel, a fixture mounted on said member near the top of the panel and having a vertical opening therethrough for receiving said first mentioned stem, a fixture mounted on said member near the bottom of the panel and having a vertical opening for receiving the lower stem on the respective end of the panel, a bracket mounted on said member and disposed above one of said fixtures, an elongated element pivoted to said bracket and movable automatically by gravity from a substantially horizontal position to a lowered vertical position above one of the stems on said panel for preventing the lifting of said panel relative to said support member and preventing the removal of said stems from the openings in said fixtures.

2. A panel structure for animal pens as defined in claim 1 in which said bracket on said member is disposed above said first mentioned fixture.

3. A panel structure for animal pens as defined in claim 1 in which said panel includes upper and lower rails and horizontally spaced vertical bars connected to said rails.

4. A panel structure for animal pens as defined in claim 1 in which each of said fixtures consists of rings secured to said supporting member.

5. A panel structure for animal pens as defined in claim 3 in which the upper stem is rigidly connected to the upper rail and extends downwardly therefrom and said lower stem is rigidly connected to the lower rail and extends downwardly therefrom.

6. A panel structure for animal pens as defined in claim 5 in which each of said fixtures consists of rings secured to said supporting member.

7. A panel structure for animal pens as defined in claim 1 in which fixtures with openings therein are disposed near the top and bottom of the panel at the end opposite said stems for receiving stems from another panel, a bracket is disposed on the panel above one of said fixtures, and an elongated element is pivoted to said bracket and movable from a substantially horizontal position to a lowered vertical position for preventing removal of the stems from the respective openings in said fixtures.

8. A panel structure for animal pens as defined in claim 6 in which fixtures with openings therein are disposed near the top and bottom of the panel at the end opposite said stems for receiving stems from another panel and a bracket is disposed on the panel near said end above one of said fixtures and an elongated element is pivoted to said bracket and movable from a substantially horizontal position to a lowered vertical position for preventing removal of the stems from the respective openings in said fixtures.

9. A panel structure for animal pens as defined in claim 6 in which an upright post-like member is connected to the respective ends of said rails, and an extension thereof forms a leg for supporting the respective end of said panel.

10. A panel structure for animal pens as defined in claim 9 in which fixtures with openings therein are mounted on said upright member near the top and bottom thereof for receiving stems from another panel, a bracket is mounted on said member above the upper fixture, and an elongated element is pivoted to said bracket and movable from a substantially horizontal position to a lowered vertical position for preventing removal of said stems from the openings in said fixtures.

* * * * *